US009172222B2

(12) United States Patent
Bozek et al.

(10) Patent No.: US 9,172,222 B2
(45) Date of Patent: Oct. 27, 2015

(54) MEDIUM-VOLTAGE SWITCHGEAR ASSEMBLY HAVING A SHORT-CIRCUITING UNIT

(71) Applicant: ABB Technology AG, Zurich (CH)

(72) Inventors: Armin Bozek, Dortmund (DE); Quirin Hall, Düsseldorf (DE)

(73) Assignee: ABB TECHNOLOGY AG, Zürich (CH)

(*) Notice: Subject to any disclaimer, the term of this patent is extended or adjusted under 35 U.S.C. 154(b) by 214 days.

(21) Appl. No.: 13/626,348

(22) Filed: Sep. 25, 2012

(65) Prior Publication Data

US 2013/0020182 A1 Jan. 24, 2013

Related U.S. Application Data

(63) Continuation of application No. PCT/EP2011/001523, filed on Mar. 25, 2011.

(30) Foreign Application Priority Data

Mar. 25, 2010 (DE) .................. 10 2010 012 827
Mar. 24, 2011 (DE) .................. 10 2011 015 066

(51) Int. Cl.
*H02B 11/02* (2006.01)
*H02B 11/26* (2006.01)
*H02B 13/065* (2006.01)
*H01H 83/20* (2006.01)

(52) U.S. Cl.
CPC .............. *H02B 11/26* (2013.01); *H02B 13/065* (2013.01); *H01H 2083/201* (2013.01)

(58) Field of Classification Search
USPC .............. 361/608, 621; 200/50.21, 50.27
See application file for complete search history.

(56) References Cited

U.S. PATENT DOCUMENTS

| 1,849,117 | A | * | 3/1932 | Starr ............................. 361/99 |
| 1,872,298 | A | * | 8/1932 | Kehoe et al. .................. 361/607 |
| 3,096,423 | A | * | 7/1963 | Wilson ......................... 200/293 |
| 3,097,904 | A | * | 7/1963 | Yarrick et al. ................ 439/252 |
| 3,130,352 | A |   | 4/1964 | Guinan |
| 3,328,648 | A | * | 6/1967 | Gryetko ........................ 361/620 |
| 3,803,374 | A | * | 4/1974 | Delgendre et al. .......... 200/61.08 |
| 5,933,308 | A | * | 8/1999 | Garzon ........................... 361/62 |
| 7,035,068 | B2 | * | 4/2006 | Shea .............................. 361/42 |

(Continued)

FOREIGN PATENT DOCUMENTS

DE 1 640 826 B1 1/1971
DE 90 13 335 U1 1/1992

(Continued)

OTHER PUBLICATIONS

International Search Report (PCT/ISA/210) issued on Oct. 6, 2011, by the European Patent Office as the International Searching Authority for International Application No. PCT/EP2011/001523.

*Primary Examiner* — Robert J Hoffberg
(74) *Attorney, Agent, or Firm* — Buchanan Ingersoll & Rooney PC

(57) ABSTRACT

A voltage switchgear assembly is disclosed, which includes a short-circuiting unit having short-circuiting devices arranged as a three-phase unit. A support is configured to receive the short-circuiting unit and is configured to be inserted into and withdrawn from an openable section of a switchgear assembly housing.

14 Claims, 5 Drawing Sheets

(56) References Cited

U.S. PATENT DOCUMENTS

| | | | |
|---|---|---|---|
| 7,145,757 B2* | 12/2006 | Shea et al. | 361/2 |
| 7,499,251 B2* | 3/2009 | Byron | 361/42 |
| 7,619,869 B2* | 11/2009 | Boeder et al. | 361/115 |
| 7,633,730 B2* | 12/2009 | Boeder et al. | 361/54 |
| 7,790,994 B2* | 9/2010 | Mason | 200/50.21 |
| 7,791,846 B2* | 9/2010 | Roscoe et al. | 361/2 |
| 7,929,260 B2* | 4/2011 | Roscoe et al. | 361/2 |
| 8,223,466 B2* | 7/2012 | Roscoe | 361/42 |
| 8,451,589 B2* | 5/2013 | Milovac et al. | 361/611 |
| 8,482,903 B2* | 7/2013 | Milovac et al. | 361/605 |
| 8,503,137 B2* | 8/2013 | Panetta | 361/10 |
| 8,564,915 B2* | 10/2013 | Roscoe et al. | 361/42 |
| 8,692,149 B2* | 4/2014 | Gentsch | 218/121 |
| 8,964,344 B2* | 2/2015 | Spangenberg et al. | 361/62 |
| 2011/0057762 A1 | 3/2011 | Burger et al. | |
| 2011/0299200 A1* | 12/2011 | Yanniello | 361/42 |
| 2015/0092304 A1* | 4/2015 | Rival | 361/3 |

FOREIGN PATENT DOCUMENTS

| | | | |
|---|---|---|---|
| DE | 94 06 161 U1 | 8/1995 | |
| DE | 94 19 141 U1 | 3/1996 | |
| DE | 102 54 497 B3 | 6/2004 | |
| EP | 1 432 090 A1 | 6/2004 | |
| WO | WO 2009030443 A1 * | 3/2009 | H01H 39/00 |
| WO | WO 2009/092621 A1 | 7/2009 | |

\* cited by examiner

MEDIUM-VOLTAGE SWITCHGEAR ASSEMBLY HAVING A SHORT-CIRCUITING UNIT

RELATED APPLICATION(S)

This application claims priority as a continuation application under 35 U.S.C. §120 to PCT/EP2011/001523, which was filed as an International Application on Mar. 25, 2011 designating the U.S., and which claims priority to German Application 10 2010 012 827.9 filed in Germany on Mar. 25, 2010 and German Application 10 2011 015 066.8 filed in Germany on Mar. 24, 2011. The entire contents of these applications are hereby incorporated by reference in their entireties.

FIELD

The disclosure relates to a voltage switchgear assembly or medium-voltage switchgear assembly having a short-circuiting unit.

BACKGROUND INFORMATION

Arc faults in medium-voltage switchgear assemblies are generally to be extinguished as quickly as possible. Protection devices for this purpose can have an arc-fault duration of 200 to 300 milliseconds, which is extinguished by actuation of a feed circuit breaker. However, for long arc-fault durations, the switchgear assembly can be damaged. Fast-acting protection relays reduce the arc-fault duration to 50 to 100 milliseconds using current limiters. However, this is still too long.

SUMMARY

A voltage switchgear assembly is disclosed, comprising: a short-circuiting unit, which includes short-circuiting devices arranged as a three-phase unit; and a support, which is configured to receive the short-circuiting unit and is configured to be inserted into and withdrawn from an openable section of a switchgear assembly housing.

A voltage switchgear assembly is disclosed, comprising: a short-circuiting unit, which includes pyrotechnic switches arranged as a three-phase unit; and a support, which is configured to receive the short-circuiting unit and is configured to be inserted into and withdrawn from an openable section of a switchgear assembly housing.

BRIEF DESCRIPTION OF THE DRAWINGS

The disclosure is explained below with reference to the exemplary embodiments shown in the drawings. In the drawings.

DETAILED DESCRIPTION

The disclosure provides a medium-voltage switchgear assembly, wherein the functionality of a fast-acting short-circuiting device can be relatively easily implemented and/or easily retrofitted.

According to the disclosure, short-circuiting devices are arranged as a three-phase unit on a support, which can be inserted into and withdrawn from an openable section of a switchgear assembly housing movably by means such as an insertion/withdrawal platform.

One exemplary embodiment includes a short-circuiting unit being provided with insertion tulips which correspond to fixed contact points within the switchgear assembly housing, and which make contact upon insertion of the short-circuiting unit into the housing.

A further exemplary embodiment includes a short-circuiting unit being provided as an at least partially encased structural unit which can be retrofitted into a switchgear assembly, or retrofitted without the insertion platform at or on a switchgear assembly. As a result of this, direct connection to the busbar can be made, for example, by means such as a roof mounting.

In an exemplary embodiment, the short-circuiting devices can be pyrotechnic switches. The switching of the pyrotechnic switches is driven by a pyrotechnic priming charge, which can achieve extremely short switching times. As a result of this and through the use of fast-acting sensor electronics, switching times, for example, of a maximum of 4 milliseconds can be obtained. Thus, arc faults can be extinguished as soon as they occur.

A further exemplary embodiment includes an electronics unit, which controls the short-circuiting unit and is retrofittable as a module unit. In accordance with an embodiment, the electronics unit can contain the tripping electronics for the short-circuiting unit.

Another exemplary embodiment provides that the electronics unit has at least two signal inputs for light detection and at least three signal inputs for current or residual-current detection. The corresponding sensors can be arranged distributed within the switchgear assembly. For example, using the corresponding sensor, one can determine precisely the location of the fault. In addition, a test mode for self-checking of the system can be implemented.

In accordance with another exemplary embodiment, the short-circuiting device be arranged as a three-phase unit on a support which can be inserted into and pushed out of a cutout, which can be opened, in a switchgear assembly housing in a moving manner, via an insertion/withdrawal platform.

Figure 1:
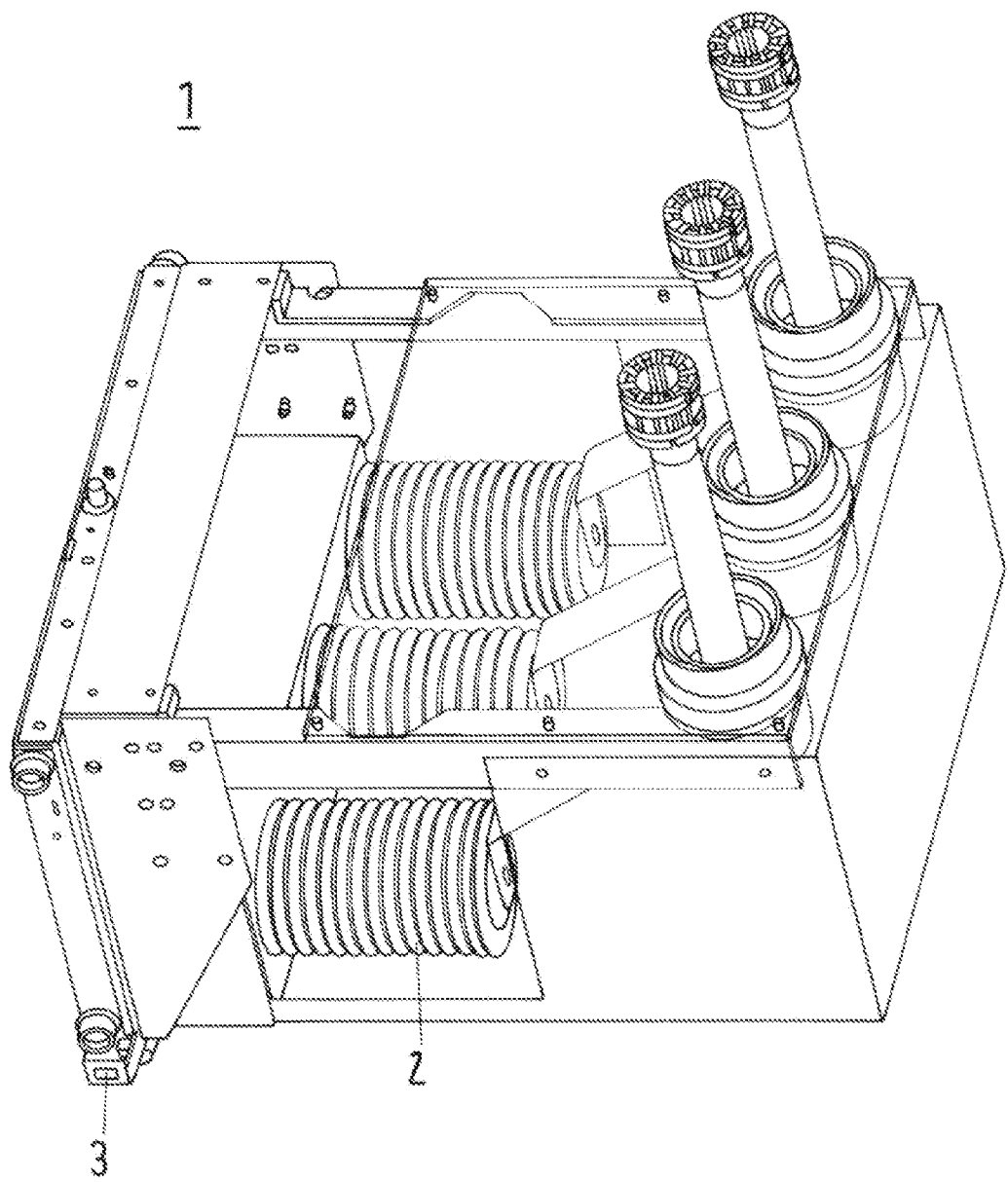
FIG. 1 shows an exemplary short-circuit module with a housing.
Figure 5:
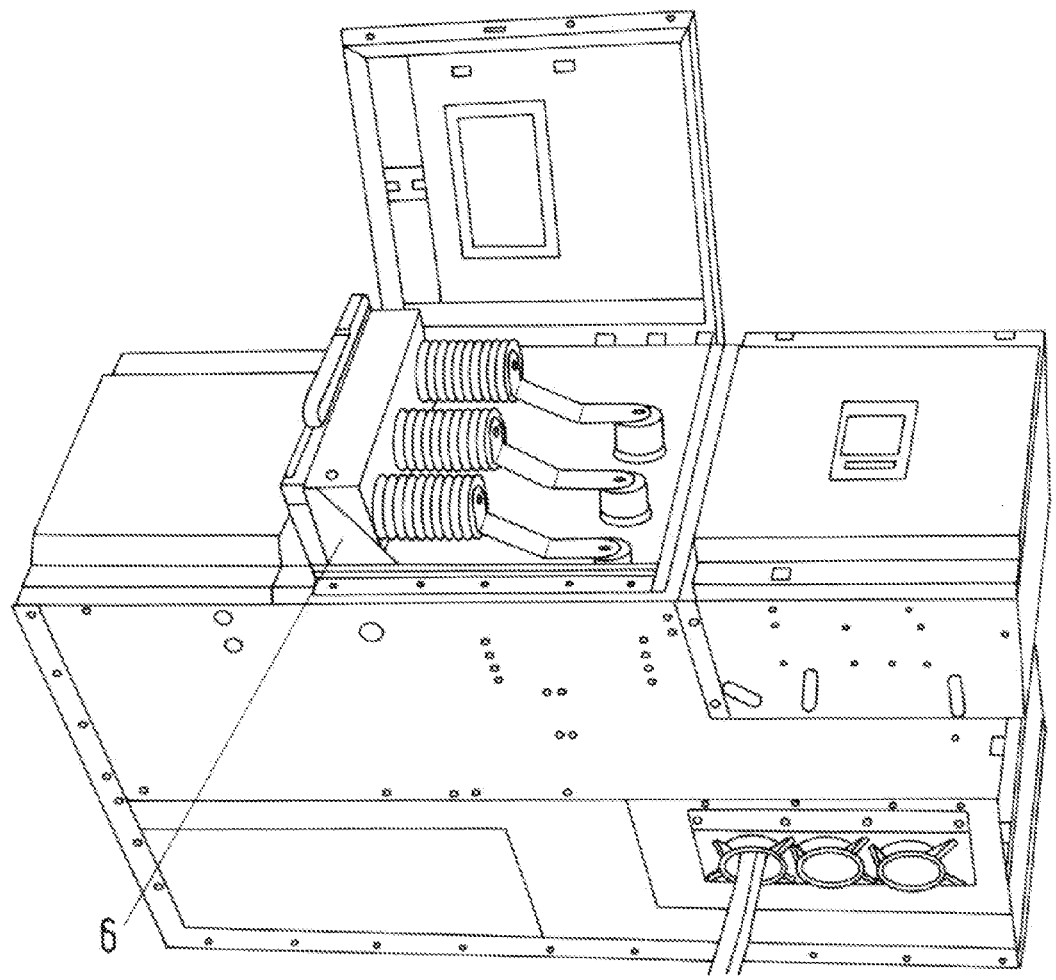
FIG. 5 shows an open state of an exemplary medium-voltage switchgear assembly.

FIG. 1 shows a short-circuiting device 1 according to an exemplary embodiment, which is implemented as a three-phase device 2 and is arranged as a unit on a support 3. In an embodiment, this support 3 in turn integrally comprises an insertion and withdrawal platform which corresponds to the openable section of the switchgear assembly or the switchgear assembly housing 4, as shown in FIG. 5. The contacts, which project upwards, then correspond, in the insertion process, to the insertion tulips of the known type, with the result that an electrical connection of the contact-insertion tulip arrangement 10 is made in the insertion end position.

Figure 2:
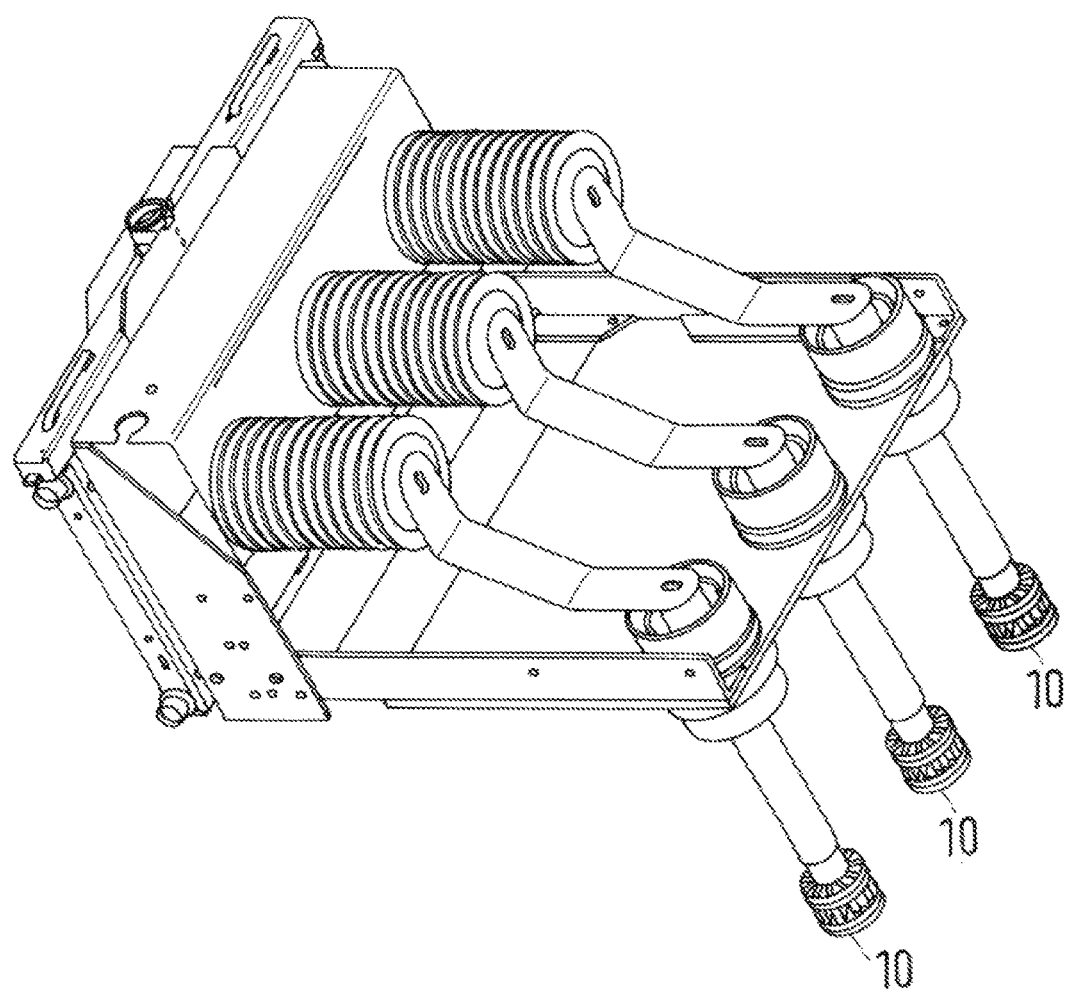
FIG. 2 shows the same as FIG. 1, with the housing.

FIG. 2 shows the illustration from FIG. 1 without the housing. In contrast, FIG. 1 shows a view through said at least partially closed housing, resulting in an encased short-circuit module. For example, such a module can also be fitted externally to the switchgear assembly.

In contrast, FIG. 2 shows the open design which can then, for example, be implemented in the switchgear assembly or the switchgear assembly housing 4.

Figure 3:
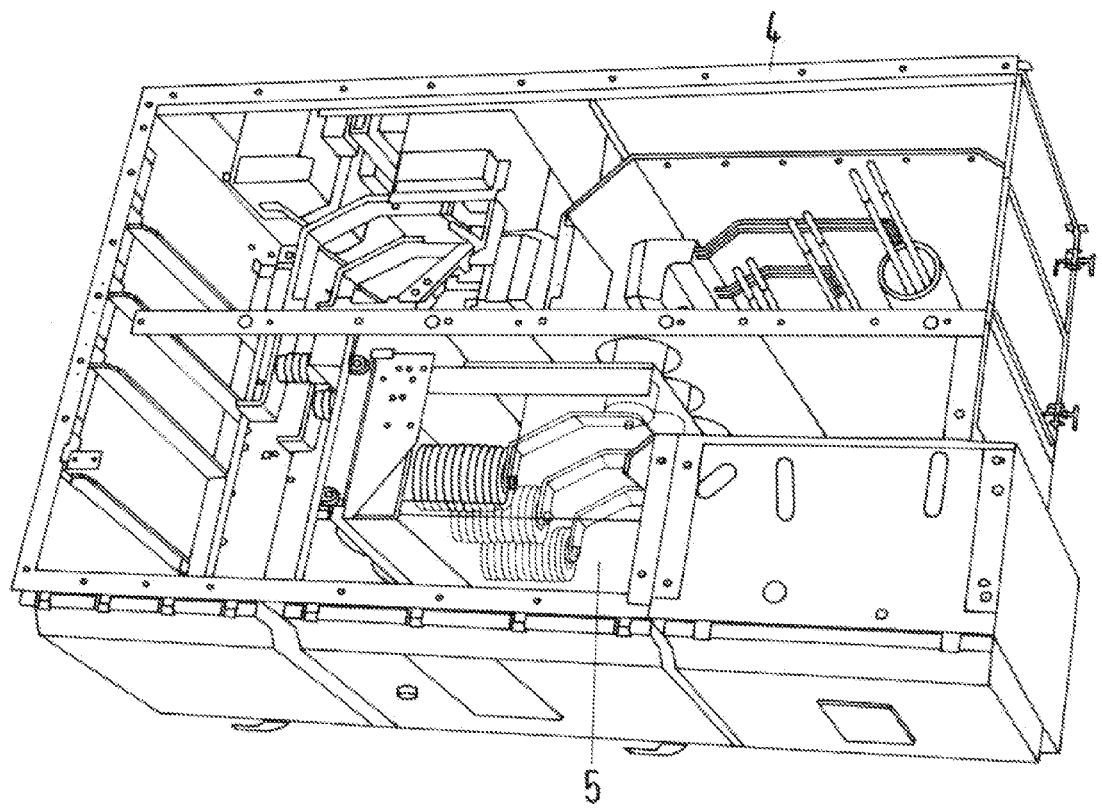
FIG. 3 shows an exemplary switchgear assembly.
Figure 4:
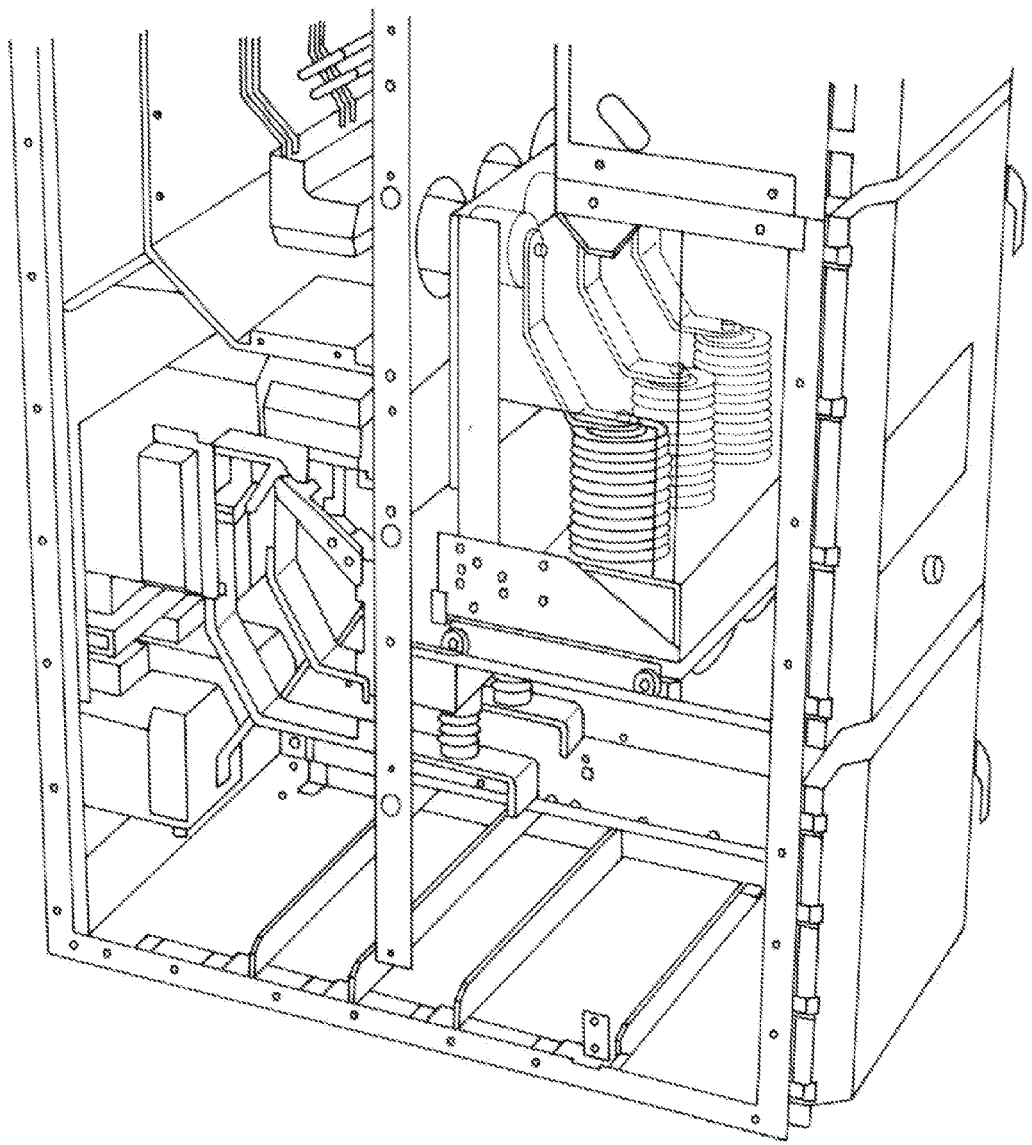
FIG. 4 shows an exemplary switchgear assembly.

FIG. 3 shows a side view into the switchgear assembly housing 4 with the openable section 5, and the short-circuit module inserted into the operational position. FIG. 4 shows another side view of the switchgear assembly housing 4 in more detail.

FIG. 5 shows the opened state of the housing of the medium-voltage switchgear assembly and the partially inserted short-circuiting unit. The movable platform 6 can be inserted and withdrawn in the manner of a sliding tray, wherein, inside the housing of the switchgear assembly, during insertion the contact-making connection of the contacts via the insertion tulips is closed, and during withdrawal this connection is opened again.

The aforementioned electronics for controlling the short-circuiting unit can be incorporated in the control part of the switchgear assembly, or a separate section in which the switchgear assembly is placed can be provided in the switchgear assembly housing. The aforementioned optical sensors are placed inside the switchgear assembly housing in a position where they can detect the arc.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A voltage switchgear assembly, comprising:
    a short-circuiting unit, which includes short-circuiting devices arranged as a three-phase unit and an electronics unit, which is configured to control the short-circuiting unit, the electronics unit comprising optical sensors, which are configured to detect an arc;
    a support, which is configured to receive the short-circuiting unit and is configured to be inserted into and withdrawn from an openable section of a switchgear assembly housing;
    a platform, which is configured to receive the support and is inserted into and withdrawn from the openable section of the switchgear assembly housing; and
    wherein the short-circuiting devices are provided with insertion tulips which correspond to fixed contact points within the switchgear assembly housing and are configured to make contact upon insertion of the three-phase unit into the switchgear assembly housing.

2. The voltage switchgear assembly as claimed in claim 1, wherein the short-circuiting unit is provided as an at least partially encased structural unit, which is configured to be implemented into the voltage switchgear assembly.

3. The voltage switchgear assembly as claimed in claim 1, wherein the short-circuiting unit is provided as an at least partially encased structural unit.

4. The voltage switchgear assembly as claimed in claim 1, wherein the short-circuiting devices are pyrotechnic switches.

5. The voltage switchgear assembly as claimed in claim 1, wherein the electronics unit is retrofittable as a module unit.

6. The voltage switchgear assembly as claimed in claim 5, wherein the electronics unit has at least two signal inputs for light detection and at least three signal inputs for current or residual-current detection.

7. The voltage switchgear assembly as claimed in claim 6, wherein the optical sensors are configured to be placed inside the switchgear assembly housing.

8. A voltage switchgear assembly, comprising:
    a short-circuiting unit, which includes pyrotechnic switches arranged as a three-phase unit and an electronics unit, which is configured to control the short-circuiting unit, the electronics unit comprising optical sensors, which are configured to detect an arc;
    a support, which is configured to receive the short-circuiting unit and is configured to be inserted into and withdrawn from an openable section of a switchgear assembly housing;
    a platform, which is configured to receive the support and is inserted into and withdrawn from the openable section of the switchgear assembly housing; and
    wherein the pyrotechnic switches are provided with insertion tulips which correspond to fixed contact points within the switchgear assembly housing and are configured to make contact upon insertion of the three-phase unit into the switchgear assembly housing.

9. The voltage switchgear assembly as claimed in claim 8, wherein the short-circuiting unit is provided as an at least partially encased structural unit, which is configured to be implemented into the voltage switchgear assembly.

10. The voltage switchgear assembly as claimed in claim 8, wherein the short-circuiting unit is provided as an at least partially encased structural unit.

11. The voltage switchgear assembly as claimed in claim 8, wherein the electronics unit is retrofittable as a module unit.

12. The voltage switchgear assembly as claimed in claim 11, wherein the electronics unit has at least two signal inputs for light detection and at least three signal inputs for current or residual-current detection.

13. The voltage switchgear assembly as claimed in claim 12, wherein the optical sensors are configured to be placed inside the switchgear assembly housing.

14. The voltage switchgear assembly as claimed in claim 8, wherein switching of the pyrotechnic switches is driven by a pyrotechnic priming charge.

* * * * *